Figure 1:
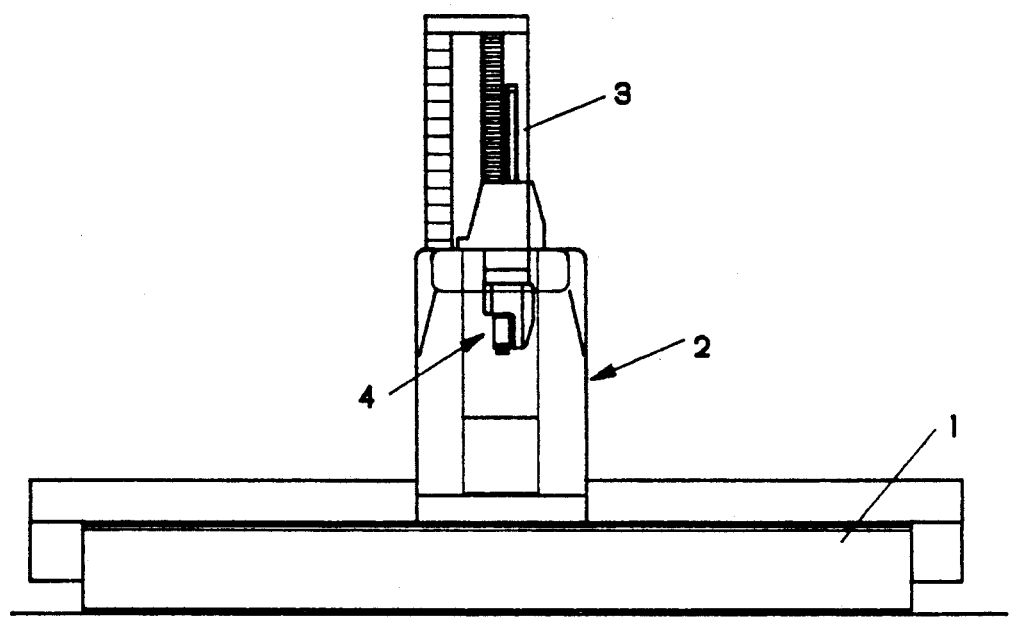

United States Patent [19]

Corsi

[11] Patent Number: 5,252,011

[45] Date of Patent: Oct. 12, 1993

[54] MOBILE-STRUCTURE MACHINE TOOL FOR RAPID MACHINING OF MODELS IN PARTICULAR

[75] Inventor: Armando Corsi, Piacenza, Italy

[73] Assignee: Jobs S.p.A., Piacenza, Italy

[21] Appl. No.: 865,199

[22] Filed: Apr. 8, 1992

[51] Int. Cl.$^5$ ............................................. B23C 1/06
[52] U.S. Cl. ................................... 409/235; 409/191
[58] Field of Search ............... 408/69, 234, 236, 237; 409/190, 191, 201, 235, 241, 80, 236

[56] References Cited

U.S. PATENT DOCUMENTS

| 3,232,141 | 2/1966 | Swanson et al. | 408/237 |
| 3,460,435 | 8/1969 | Hucks et al. | 409/235 |
| 3,540,318 | 11/1970 | Greenberg | 408/69 |
| 4,085,625 | 4/1978 | Jung | 409/134 |
| 5,152,645 | 10/1992 | Corsi | 409/235 |

FOREIGN PATENT DOCUMENTS

| 2350761 | 10/1974 | Fed. Rep. of Germany | 408/234 |
| 188057 | 8/1986 | Japan | 409/241 |
| 114806 | 5/1988 | Japan | 408/236 |
| 66549 | 3/1991 | Japan | 408/234 |

*Primary Examiner*—Daniel W. Howell
*Attorney, Agent, or Firm*—Notaro & Michalos

[57] ABSTRACT

This invention relates to a machine tool, designed for rapid machining of models in particular, which comprises a C-shaped structure fitted with a toolhead with several degrees of freedom which can move parallel to one of the machine axes in order to machine non-tough materials rapidly; for example, it can be used to produce plastic models which are to undergo further finishing operations.

7 Claims, 2 Drawing Sheets

MOBILE-STRUCTURE MACHINE TOOL FOR RAPID MACHINING OF MODELS IN PARTICULAR

This invention relates to a machine tool, designed for rapid machining of models in particular, which comprises a C-shaped structure fitted with a toolhead with several degrees of freedom which can move parallel to one of the machine axes in order to machine non-tough materials rapidly; for example, it can be used to produce plastic models which are to undergo further finishing operations.

The machine is able to perform precision machining extremely rapidly, and is characterised by the special configuration of its parts, which is designed to facilitate automatic feed of the workpieces.

The result is a highly practical, fast-operating device.

The invention falls into the category of advanced machine tools, i.e. machines with at least 5 or 6 degrees of freedom which are able to perform complex machining operations on 3-dimensional surfaces to very fine tolerances.

Italian patent application 44804 A/90 (equivalent to U.S. Ser. No. 07/656,239) filed by the same applicant describes a machine tool with a cab structure, comprising a table which moves along a basically horizontal axis and a sleeve which moves along a pair of axes at right angles to the preceding axis, the said pair of axes together with that axis constituting a set of three right angles, and an operating head fitted below the said sleeve and featuring several degrees of freedom.

The guides along which the sleeve support moves are located in the upper part of the structure of the machine, while the toolhead moves inside it.

This machine, which was designed for use in engineering departments where sound-proofing characteristics take priority over speed of operation or, in particular, over minimising stoppages, presents some limitations if used in a factory to manufacture a large number of pieces, especially because the machine has to be stopped and the cab opened in order to replace the workpiece, which slows down the pace of work.

This difficulty is eliminated by the present invention, a machine tool designed for rapid machining of models, which has an open structure so that the workpieces can be fed automatically, e.g. by a conveyor belt.

In particular, the machine in accordance with the invention is the type with a C-shaped structure; however, part of this structure projects and moves along an axis parallel to the direction of feed of the workpieces, and these movements are subject to numerical control.

The cross-shaped support of a sleeve fitted with a toolhead presenting two or more degrees of freedom moves along this structure.

Figure 2:
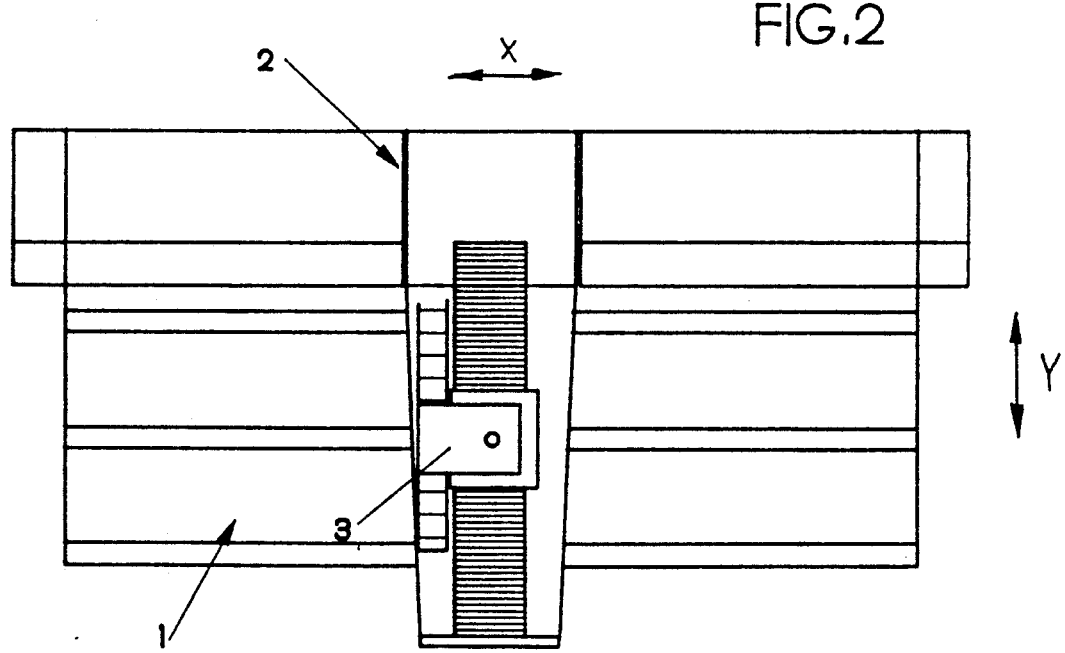
Figure 3:
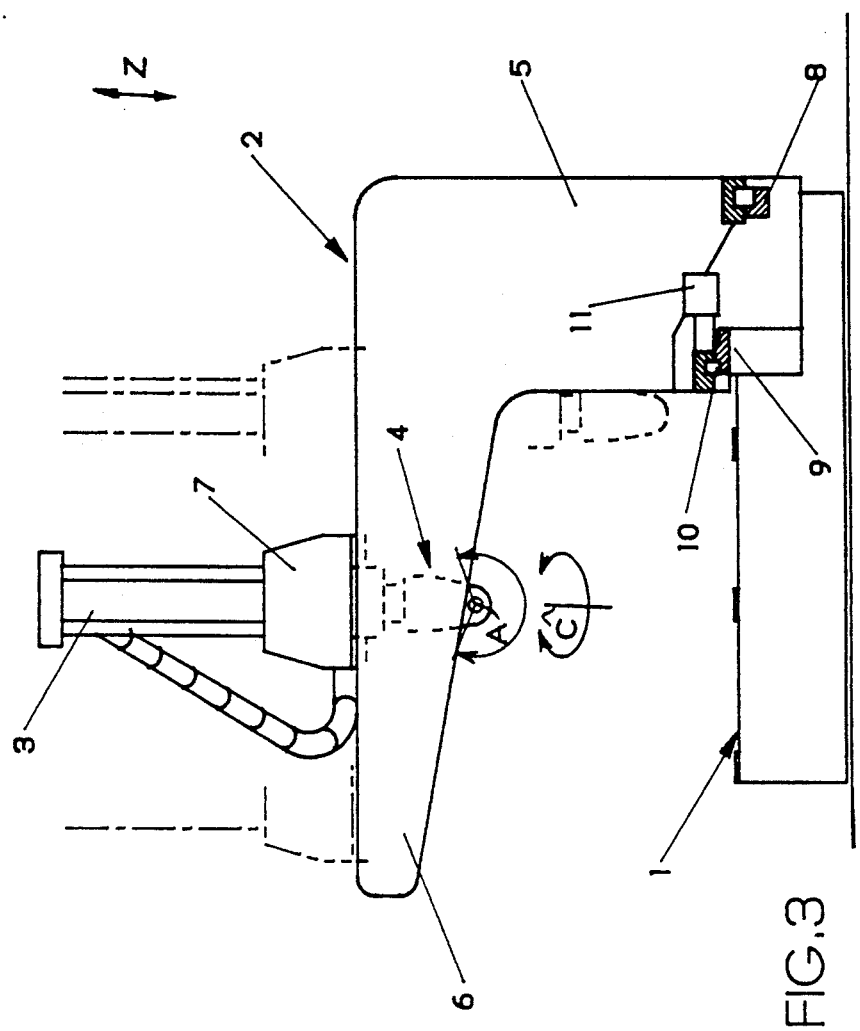
Figure 4:
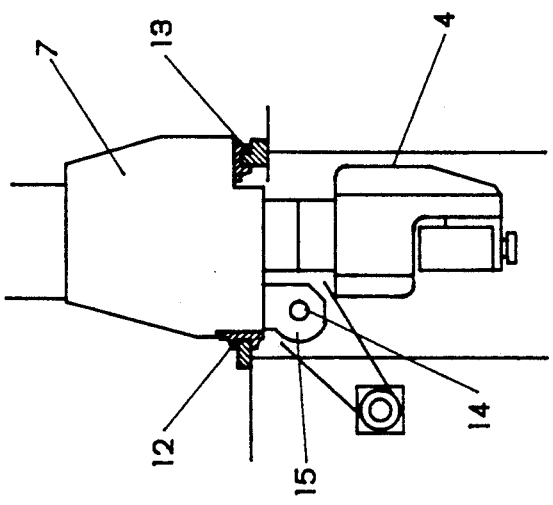

This invention will now be described in detail, by way of example but not of limitation, with particular reference to the annexed figures in which:

FIG. 1 illustrates the front view of the machine in accordance with the invention FIGS. 2 and 3 are the top and side views of the machine FIG. 4 is a view in cross-section of a portion of FIG. 2.

With reference to the figures, the machine in accordance with the invention comprises a fixed base 1 along which a structure moves, the entire structure assembly being marked 2; a sleeve 3, to the bottom of which is fitted a toolhead 4 presenting two or more degrees of freedom, is fitted to the said structure. Base 1 constitutes the workpiece support table; the workpieces are automatically fed to the machine, for example by a conveyor belt or the like, being of known type and therefore not illustrated in the figures.

Structure 2, more particularly illustrated in FIG. 3, consists of a projecting structure with an upright 5 and a platform 6 along which slides a cross-shaped support 7 to which is fitted sliding sleeve 3.

Structure 2 slides parallel to base 1 (axis X) (FIG. 2); cross-shaped support 7 moves at right angles to the structure (axis Y) (FIG. 2), and sleeve 3 can perform vertical movements in relation to support 7 (axis Z) (FIG. 3).

These three movements take place along the principal axes of the machine, in addition to which there are a pair of head rotation axes A and C.

The head as such is of known type, and is therefore not described in detail.

A numerical control system controls all the movements described above.

Structure 2 (FIG. 2) slides along a pair of guides 8 and 9 built into base 1, and these movements are actuated via a recirculating-ball screw or the like 10, which is driven by a motor illustrated schematically and marked 11.

Cross-shaped support 7 is fitted on runners to slide along structure 2 on a pair of recirculating-ball prismatic guides numbered 12 and 13 respectively, one positioned on a vertical and the other on a horizontal plane. This facilitates regulation of the cross-shaped support, e.g. using micrometer screws or a similar system.

The movements of support 7 with sleeve 3 and head 4 along axis Y are controlled, for example, by a d.c. motor which drives a recirculating-ball screw 14, which in turn engages a slider 15 built into support 7.

An encoder, not illustrated, detects all these movements.

During operation the workpieces are fed to the machine by a conveyor belt which moves parallel to structure 2, bringing the pieces to the table and removing them when the job is finished.

Structure 2, driven by motor 11 via recirculating-ball screw 10, moves along axis X, parallel to the longer side of base 1 and the related table, sliding along guides 8 and 9.

In the same way cross-shaped support 7 moves along projecting part 6 of the structure with the sleeve, which moves in a basically vertical direction to bring the head into position on the tip; the head will then be inclined as necessary, depending on the type of job to be performed, the tool used, etc.

While the machine is performing its task the numerical control device controls the movements of structure 2, support 7 and sleeve 3 and the head inclination, in order to ensure maximum machining precision.

The fact that structure 2 moves parallel to the table means that the machine is much smaller than known types in which the structure is fixed and the table moves; the latter system requires suitable supports to keep the table perfectly parallel at all times in order to achieve the required machining precision.

An expert could devise various ways of putting the same idea into practice, all of which would still fall within the scope of this invention.

The dimensions and materials used can obviously be varied as necessary in accordance with operational requirements.

I claim:

1. A machine tool for rapid machining of models and used in conjunction with numerical control means for controlling movement of the machine tool, the machine tool comprising:

a base (1);

a structure (2) movably connected to the base along a first horizontal axis (x), the structure having a vertical upright (5) and a horizontal platform (6) integrally formed with the vertical upright to form the structure;

a support (7) movably mounted to the horizontal platform (6) along a second horizontal axis (y) which is transverse to the first horizontal axis;

a sleeve (3) movably mounted to the support (7) along a third axis (z) which is vertical;

a toolhead (4) movably mounted to the sleeve, the movement of the toolhead, the structure, the support and the sleeve being controlled by the numerical control means; and access between the base and the toolhead being open on three sides of the vertical upright.

2. The machine tool according to claim 1, wherein the first axis is perpendicular to the second axis and to the third axis.

3. The machine according to claim 2, wherein the base includes at least one guide therein for movably receiving the structure.

4. The machine tool according to claim 3, including a recirculating-ball screw engaged with the guide for movement of the structure along the base.

5. The machine tool according to claim 4, including a further recirculating-ball screw engaged with the support for movement of the support on the platform.

6. The machine tool according to claim 5, including a slider engaged with the further recirculating-ball screw.

7. The machine tool according to claim 1, wherein the toolhead is mounted for rotation about a least one rotation axis (A,C) to the sleeve.

* * * * *